United States Patent [19]

Forbes

[11] 4,219,173

[45] Aug. 26, 1980

[54] INSULATED PIPE SUPPORTS

[76] Inventor: George A. Forbes, Kennesaw, Highfield Rd., West Byfleet, Surrey, England

[21] Appl. No.: 947,154

[22] Filed: Sep. 29, 1978

[30] Foreign Application Priority Data

Oct. 5, 1977 [GB] United Kingdom ............... 41315/77

[51] Int. Cl.² .......................... F16L 11/12; F16L 5/00
[52] U.S. Cl. ......................................... 248/56; 285/47
[58] Field of Search .............. 248/56; 285/47; 52/219, 52/220, 303

[56] References Cited

U.S. PATENT DOCUMENTS

| 3,848,897 | 11/1974 | McClellan | 248/56 X |
| 4,061,344 | 12/1977 | Bradley et al. | 248/56 X |

Primary Examiner—James C. Mitchell
Attorney, Agent, or Firm—Scully, Scott, Murphy & Presser

[57] ABSTRACT

A support for a thermally insulated pipe or ducting which support comprises means for defining an outer sleeve for positioning in an aperture in a fire rated wall member, and means within the sleeve comprising load bearing insulating material for engaging a pipe or ducting to provide support therefor and fire retardant material adapted to engage, in use, around a pipe or ducting supported as aforesaid for retarding the passage of fire through the aperture.

14 Claims, 1 Drawing Figure

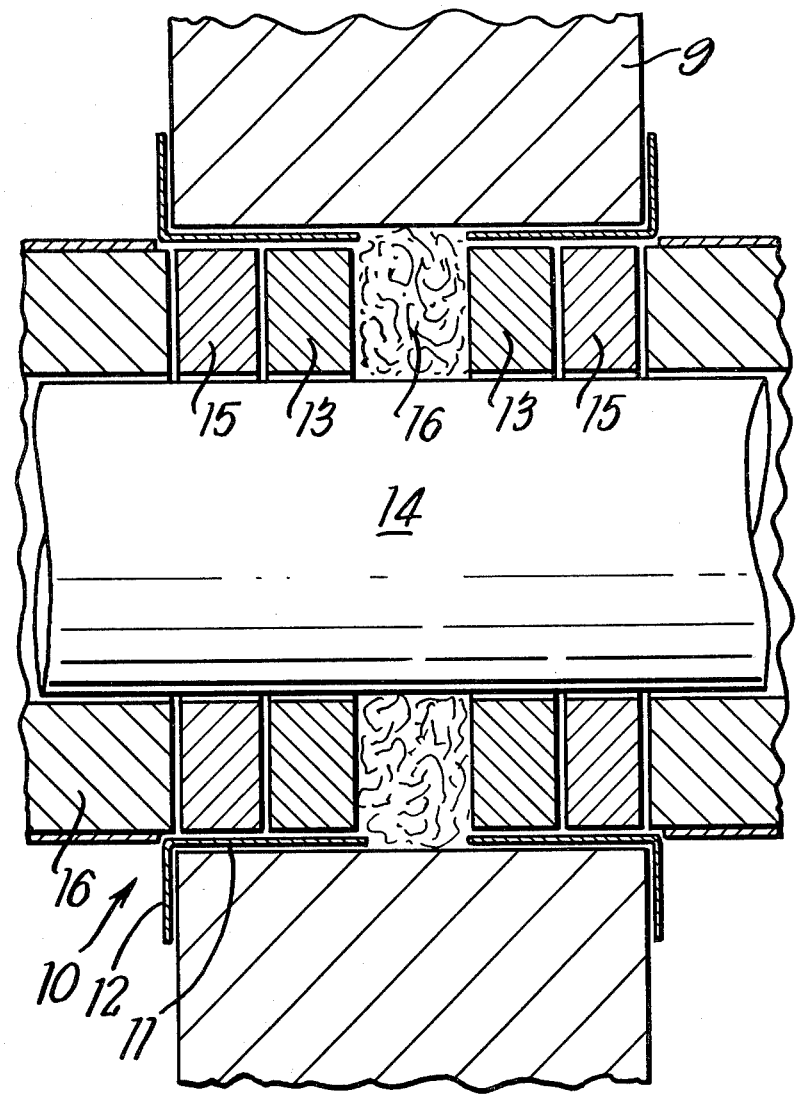

INSULATED PIPE SUPPORTS

FIELD OF THE INVENTION

This invention relates to supports for thermally insulated pipes or ducting and more particularly to supports for such pipes or ducting in building structures at positions where they pass through boundary walls, ceilings, and floors of compartments of such structures.

BACKGROUND TO THE INVENTION

In building structures, the boundary wall members are frequently constructed to provide a means of delaying a conflagration spreading from one part of the structure to another. Such wall members are constructed to specific fire ratings in accordance with the length of the time during which said members can prevent spreading of a conflagration as aforesaid.

It is an object of the invention to provide a support for thermally insulated pipes or ducting extending through fire rated wall members, which itself affords a measure of retardation to spread of fire through an aperture in the wall in which the support is mounted in use.

SUMMARY OF THE INVENTION

According to the invention there is provided a support for a thermally insulated pipe or ducting which support comprises means for defining an outer sleeve for positioning in an aperture in a fire rated wall member, and means within the sleeve comprising load bearing material for engaging a pipe or ducting to provide support therefore and fire retardant material adapted to engage, in use, around a pipe or ducting supported as aforesaid for retarding the passage of fire through the aperture.

In some embodiments of the invention, said means within the sleeve may comprise at least one annulus of load bearing material and at least one annulus of fire retardant material.

In other embodiments of the invention, said means within the sleeve may comprise at least one annulus of a material which has load bearing and fire retardant properties.

Preferably the load bearing material is also a heat and/or sound insulating material, e.g. cork, a rubber/cork composition, bonded heavy density fibrous insulation, mineral or glass wool, calcium silicate.

It is desirable that said load bearing material is capable in use of isolating a pipe or ducting from a building structure so as to prevent vibratory noise being adsorbed by the structure thereby to reduce noise levels in the building. It is also desirable that such material is capable in use of isolating and thermally insulating the pipe or ductng when carrying heated or refrigerated fluids in order to minimize heat losses therefrom or the formation of frost thereon. Moreover by providing said fire retardant material it is possible to restrict the spread of fire from one compartment of the building structure to another which would otherwise occur due to the deterioration and break down of thermal and sound insulating materials at temperatures well below those normally experienced under combustion conditions.

It is also preferred that fire retardant material has a fire rating of at least 1 hour, and most preferably at least 4 hours, fire retardancy to the relevant part of British Standard BSS 476. Examples of suitable materials are heavy density mineral or glass fibrous materials, foamed cementatious or exfoliated materials.

The invention also provides a wall member of a building structure having a support as aforesaid located in an aperture in said wall member and supporting pipe or ducting extending through said aperture.

The invention further provides a method of supporting a pipe or ducting passing through an aperture in a wall member of a building structure to provide a measure of retardation to spread of fire through the aperture, which method comprises supporting the pipe or ducting on load bearing material provided in said aperture and providing fire retardant material around the pipe or ducting so as to provide a barrier in the aperture capable of retarding the passage of fire through the aperture.

BRIEF DESCRIPTION OF DRAWING

A section through a support embodying the invention supporting a pipe or ducting extending through a wall of a building structure.

DETAILED DESCRIPTION

Referring to the drawing, there is shown a support 10 located in an aperture in a wall 9 of a building structure. The wall 9 may be made of a material, e.g. brick or concrete, and have a thickness which provides a fire rating of for example 4 hours fire retardancy to the relevant part of British Standard BSS 476.

The support 10 comprises two tubular elements, provided by metal sleeves 11 having end flanges 12 abutting respective opposite sides of the wall 9. The flanges 12 are preferably provided by a form of colour code, e.g. a suitably coloured plastics strip, to identify the service passing through the support, e.g. heated water pipe, chilled water pipe, in accordance with British Standard BSS 1710. The sleeves may have any cross-sectional shape, e.g. circular, rectangular, oval, which is suitable for encircling a particular ducting. Each sleeve 11 has a ring 13 of load bearing material having heat and sound insulating properties, e.g. cork located therein and bonded to the sleeve. The sleeves 11 must have sufficient width to support the weight of the pipe or ducting. The thickness of the insulating material is preferably the same as that of insulating lagging 16 provided around a pipe or duct 14 which is supported in the aperture in wall 9 by support 10. Each sleeve 11 is also provided with a ring 15 of fire retardant material which is located in and bonded to the sleeve adjacent to a respective end of the wall aperture in order to provide a fire retardant barrier facing a source of heat which may exist in either compartment of the building structure separated by the wall 9. In other embodiments the rings 13 and 15 may be located within the sleeve by means other than bonding, e.g. in peripheral recesses formed in the sleeves.

A space is formed within the wall aperture between the metal sleeves 11 and is preferably filled with a loose packed fibre glass or other suitable heat insulating material 16 to assist in reducing conduction of heat between the sleeves. This arrangement is desirable to prevent or delay deterioration of a load bearing ring in one sleeve caused by heat conducted along the other metal sleeve facing a conflagration.

Each sleeve 11 is provided by two half sections which are assembled around a pipe or ducting with longitudinal edges of the sections in abutment or in an overlapping relation. Each such section is provided with sections of load bearing and fire retardant material which cooperate in the assembled sleeve to provide the aforesaid rings 13 and 15. In a preferred construction, at the longitudinal abutting edges of each half section there is formed during fabrication of the section a pair of diametrically opposed radially inwardly projecting flanges extending along the length of each section. These flanges serve to retain the sections of load bearing and fire retardant material with the respective half sleeve sections during handling of the sleeve sections. The pipe or ducting, or several pipes or ductings, having such sleeves assembled thereon are passed through an enlarged aperture in wall 9 and the space between the aperture wall and the sleeves is then filled in to firmly locate the sleeves with the wall.

In other embodiments of the invention, the support 10 may comprise a single sleeve having a ring or rings of load bearing and insulating material located centrally within the sleeve and a pair of fire retardant rings located within the sleeve one on each side of those ring or rings. In further embodiments the sleeve may be provided with one or more rings of a material having load bearing and fire retardant properties, e.g. calcium silicate, and of sufficient width to support the pipe or ducting.

It will be appreciated that the above-described support may be provided in a horizontal wall member of a building structure, e.g. a ceiling or wall, in order to support a pipe or ducting passing therethrough.

What is claimed is:

1. A fire-retardant support means for service equipment extending through an aperture in a partitioning member of a building, comprising a pair of annular integrated support units for insertion in respective opposite ends of said aperture around said service equipment, each unit comprising means defining an outer sleeve and integral means, fixedly located within said sleeve, comprising load bearing material for engaging and supporting said service equipment and fire retardant material for engaging around said service equipment to prevent the spread of fire through said aperture, wherein the outer sleeve members of said units are spaced apart in the aperture to inhibit conduction of heat through the aperture through said outer sleeves.

2. A support means as claimed in claim 1, wherein said means within each sleeve comprises at least one annulus of load bearing material and at least one annulus of fire retardant material.

3. A support means as claimed in claim 1, wherein said means within each sleeve comprises at least one annulus of a material which has load bearing and fire retardant properties.

4. A support means as claimed in claim 1, wherein the load bearing material is also heat and sound insulating material.

5. A support means as claimed in claim 1, wherein said outer sleeve is provided by a plurality of arcuate sleeve sections, each being provided with a section of fire retardant material and at least one section being provided with load bearing material fixedly located with the respective sleeve section.

6. A support means as claimed in claim 1, wherein said outer sleeve has an outwardly directed flange at one end to abut a surface of the wall member and to provide a surface for receiving an identification with respect to the service equipment for which the support is required.

7. A support means as claimed in claim 1, wherein said fire retardant material has a fire rating of at least 1 hour fire retardancy.

8. A support means as claimed in claim 7, wherein said fire rating is at least 4 hours.

9. A support means as claimed in claim 1, wherein the thickness of the load bearing and fire retardant material is substantially the same as that of insulating lagging applied to said service equipment.

10. A support means as claimed in claim 1, wherein a layer of fire retardant material is provided at or adjacent each opposite end of said aperture.

11. A support means as claimed in claim 1, wherein heat insulating material is provided in the space defined within the aperture between said support units.

12. A support means as claimed in claim 5, wherein each outer sleeve section has radially inwardly directed flanges along its axially extending longitudinal edges to fixedly locate said inner arcuate means in position within the section.

13. A method of supporting service equipment passing through an aperture in a partitioning member of a building structure to provide a measure of retardation to the spread of fire through the aperture, comprising inserting, at each respective opposite ends of said aperture, a support unit forming an outer sleeve extending around the annular end portion of the aperture and having fixedly located therein load bearing material for supporting the service and fire retardant material around the service equipment to provide barriers at opposite ends of said aperture capable of retarding the passage of fire through said aperture, said units being spaced apart in said aperture to inhibit conduction of heat through the aperture through the outer sleeves of the units.

14. A method as claimed in claim 13, including providing at least one annulus of a material which has load bearing and fire retardant properties in the aperture to support the service equipment and to enable said barrier to retard the passage of fire.

* * * * *